(12) United States Patent
Schladetzky et al.

(10) Patent No.: US 8,879,467 B2
(45) Date of Patent: Nov. 4, 2014

(54) TRANSPORTING GSM PACKETS OVER A DISCONTINUOUS IP BASED NETWORK

(75) Inventors: Brian Schladetzky, Bellevue, WA (US); Lance Proctor, Kent, WA (US); Rajeev Kumar Singh, Redmond, WA (US); Arti Chauhan, Sammamish, WA (US); Praveen Coddambakkam, Bellvue, WA (US); James K. Crutcher, Bothell, WA (US)

(73) Assignee: Broadcom Corporation, Irvine, CA (US)

( * ) Notice: Subject to any disclaimer, the term of this patent is extended or adjusted under 35 U.S.C. 154(b) by 250 days.

(21) Appl. No.: 13/171,069

(22) Filed: Jun. 28, 2011

(65) Prior Publication Data

US 2011/0310803 A1 Dec. 22, 2011

Related U.S. Application Data

(63) Continuation of application No. 12/152,469, filed on May 14, 2008, now Pat. No. 7,969,929.

(60) Provisional application No. 60/930,630, filed on May 15, 2007.

(51) Int. Cl.
*H04B 7/212* (2006.01)
*H04W 80/04* (2009.01)
*H04W 28/04* (2009.01)
*H04L 1/00* (2006.01)

(52) U.S. Cl.
CPC ............. *H04W 80/04* (2013.01); *H04W 28/04* (2013.01); *H04L 2001/0097* (2013.01); *H04L 1/0082* (2013.01)
USPC ........................... 370/324; 370/352; 370/350

(58) Field of Classification Search
USPC .......................... 370/352, 324, 350
See application file for complete search history.

(56) References Cited

U.S. PATENT DOCUMENTS

| | | | |
|---|---|---|---|
| 6,188,980 B1 * | 2/2001 | Thyssen | 704/230 |
| 6,452,941 B1 | 9/2002 | Bruhn | |
| 6,530,055 B1 * | 3/2003 | Fukunaga | 714/746 |
| 6,671,287 B1 | 12/2003 | Huttunen et al. | |
| 6,731,946 B1 | 5/2004 | Stanwood et al. | |
| 6,738,374 B1 | 5/2004 | Olkkonen et al. | |

(Continued)

FOREIGN PATENT DOCUMENTS

WO    WO 2008/143871    11/2008

OTHER PUBLICATIONS

International Preliminary Report on Patentability for Application No. PCT/US2008/006148, 9 pages, Nov. 17, 2009.

*Primary Examiner* — Ricky Ngo
*Assistant Examiner* — Dewanda Samuel
(74) *Attorney, Agent, or Firm* — Sterne, Kessler, Goldstein & Fox P.L.L.C.

(57) ABSTRACT

A system for transferring data includes an interface configured to receive data that is sent via a first link, and a processor coupled to the interface. The processor is configured to: receive data that is sent via a first link; determine whether there is discontinuity in the received data, the determination being based at least in part on information included in the received data; in the event that the received data includes a discontinuity, generate replacement data that repairs the discontinuity; and transmit at least a portion of replacement data to a second link such that a synchronization requirement associated with the second link is fulfilled.

14 Claims, 10 Drawing Sheets

(56) References Cited

U.S. PATENT DOCUMENTS

| | | | |
|---|---|---|---|
| 6,898,416 B2 | 5/2005 | Saarinen et al. | |
| 6,917,604 B2 | 7/2005 | Jyrkka | |
| 6,968,309 B1 * | 11/2005 | Makinen et al. | 704/219 |
| 7,047,190 B1 * | 5/2006 | Kapilow | 704/228 |
| 7,069,208 B2 | 6/2006 | Wang | |
| 7,092,398 B2 | 8/2006 | Schweitzer | |
| 7,295,247 B2 | 11/2007 | Bang | |
| 7,447,639 B2 | 11/2008 | Wang | |
| 7,729,327 B2 * | 6/2010 | Yaqub | 370/338 |
| 7,969,929 B2 | 6/2011 | Schladetzky et al. | |
| 8,165,224 B2 * | 4/2012 | Simmons et al. | 375/240.27 |
| 2002/0082006 A1 * | 6/2002 | Narvanen et al. | 455/426 |
| 2002/0133764 A1 * | 9/2002 | Wang | 714/707 |
| 2003/0236674 A1 * | 12/2003 | Henry, Jr. | 704/500 |
| 2004/0120309 A1 * | 6/2004 | Kurittu et al. | 370/352 |
| 2005/0094622 A1 | 5/2005 | Mallila | |
| 2007/0087756 A1 | 4/2007 | Hoffberg | |
| 2007/0100611 A1 * | 5/2007 | Ps et al. | 704/213 |
| 2007/0174047 A1 | 7/2007 | Anderson et al. | |
| 2007/0183378 A1 | 8/2007 | Passarella et al. | |
| 2007/0291836 A1 * | 12/2007 | Shi et al. | 375/240.01 |
| 2008/0130539 A1 * | 6/2008 | Lauer et al. | 370/310 |
| 2008/0285478 A1 | 11/2008 | Schladetzky et al. | |

* cited by examiner

TRANSPORTING GSM PACKETS OVER A DISCONTINUOUS IP BASED NETWORK

CROSS REFERENCE TO RELATED APPLICATIONS/INCORPORATION BY REFERENCE

This present application is a CONTINUATION of U.S. application Ser. No. 12/152,469, filed May 14, 2008, now issued U.S. Pat. No. 7,969,929. Said U.S. application Ser. No. 12/152,469, makes reference to, claims priority to and claims benefit from U.S. Provisional Application No. 60/930,630, filed May 15, 2007. The above-identified applications are hereby incorporated herein by reference in their entirety.

BACKGROUND OF THE INVENTION

Global System for Mobile Communications (GSM) is a widely used mobile system standard. FIG. 1 is a block diagram illustrating the architecture of a typical GSM system. In system 100, a Mobile Station (MS) 102 such as a handset communicates with a Base Transceiver Station (BTS) 104, which typically includes a tower or other structure with one or more antennas and associated radio transceivers. The BTS typically relays data between the mobile station and the core mobile network 108 via a dedicated point-to-point communication link to a Base Station Controller (BSC) 106. More than one BTS may be configured to communicate with the same BSC. Interface 110 between the BTS and the BSC is a synchronized interface. Requirements for the interface are specified by the GSM standard. The physical layer of the interface is typically implemented using a T1 or E1 link to provide a reliable connection between the BTS and the BSC. While the link is active, synchronization data is transferred at a rate specified by the network layer protocol. Interface 112 between the BTS and the MS is also a synchronized link with certain specifications defined by the GSM standard. Since the interface is wireless, it is sometimes referred to as an Air interface.

New generations of GSM architecture have been proposed to support more flexible network configurations and provide better voice and data services. It would be desirable to have GSM systems capable of communicating over the Internet and supporting network layer protocols such as the Internet Protocol (IP). It would also be useful for the new generations of GSM systems to be compatible with existing BSCs and MSs.

BRIEF DESCRIPTION OF THE DRAWINGS

Various embodiments of the invention are disclosed in the following detailed description and the accompanying drawings.

DETAILED DESCRIPTION

Figure 1:
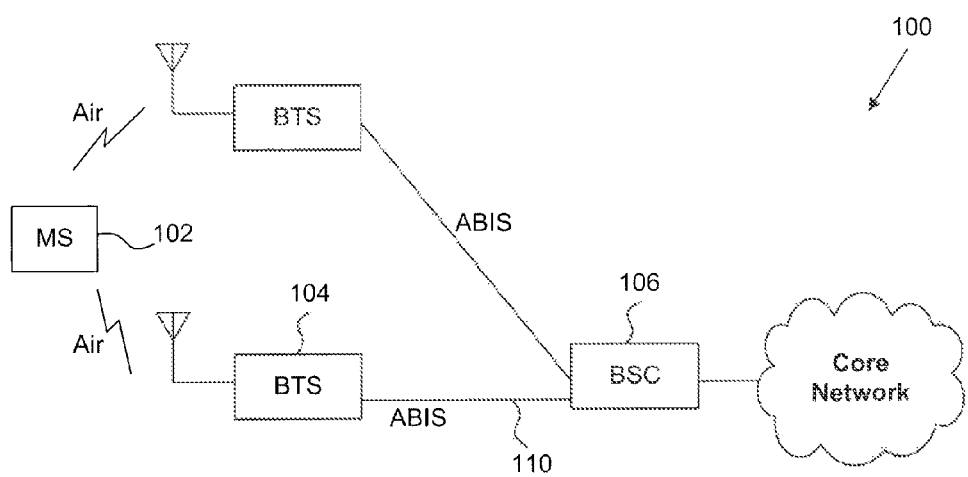
FIG. 1 is a block diagram illustrating the architecture of a typical GSM system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The GSM standard sets forth requirements for the interface between the BTS and the BSC (referred to as an Abis interface), and the interface between the BTS and the MS (referred to as an Air interface). A network layer (layer 3 of the Open System Interconnection (OSI) Reference Model) protocol is defined for these interfaces. The Abis and the Air interfaces have certain synchronization requirements. Specifically, while a session is active, a predetermined number of consecutive packets are required to be sent/received on the interface during a given amount of time. While existing techniques can easily fulfill these requirements given a reliable network connection between the BTS and the BSC, it is more difficult to meet the requirements when the BTS and the BSC are connected via a discontinuous, unsynchronized network such as the Internet. A synchronizer is used in some embodiments to evaluate received data and send packets to the synchronized interface to ensure that the synchronization requirements are fulfilled in Abis interface in the uplink direction to the BSC and the Air Interface in the downlink direction to the MS. Although GSM systems are described in detail in the discussions, the techniques are also applicable to other wireless networks with synchronized interfaces, such as Universal Mobile Telecommunications System (UMTS).

Figure 2:
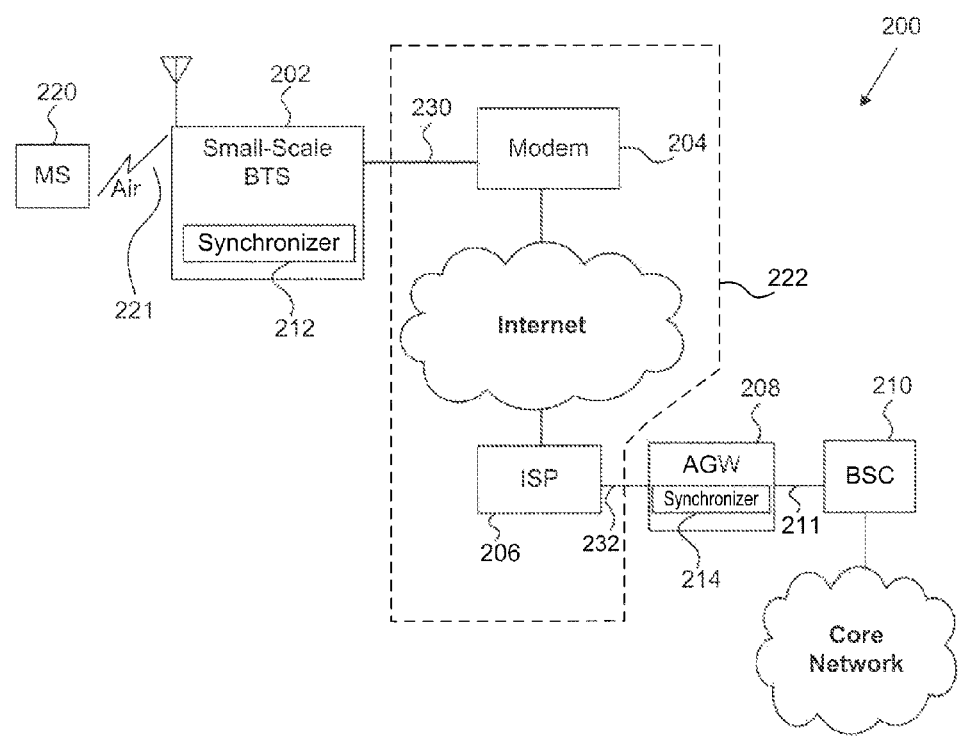
FIG. 2 is a block diagram illustrating an embodiment of a GSM system that supports transferring GSM data (including audio, video, or other appropriate data) over the Internet.

FIG. 2 is a block diagram illustrating an embodiment of a GSM system that supports transferring GSM data (including audio, video, or other appropriate data) over the Internet. In this example, system 200 includes a small-scale BTS 202, which communicates via a GSM based wireless link with mobile stations such as 220. A small-scale BTS is designed to provide a smaller area of coverage compared with a traditional BTS. For example, a small-scale BTS may be configured to service a relatively small area such as a home, a small office/enterprise, to provide dedicated or additional coverage for areas with higher user density or demand (such as airports), etc. The small-scale BTSs are sometimes referred to by a variety of terms, depending on their size and configuration, including without limitation by terms such as "micro-BTS", "pico-BTS", and "femto-BTS", which terms distinguish such smaller scale installations from a traditional BTSs, which is sometimes referred to as a "macro-BTS" deployed to serve as an associated "macro-cell". The system also includes a BSC 210 configured to exchange data with the core network.

In the example shown, the direct point-to-point link between a traditional BTS and a BSC is replaced with an unsynchronized link. The link is unsynchronized since it is not a point-to-point link that transfers data with a fixed amount of delay. Instead, data is transfers via an IP network, such as the Internet, which may include one or more nodes and one or more types of physical links (wireless, wireline, ATM, Ethernet, Frame Relay, etc.). Further, the configuration of the network can change dynamically as devices join or leave the network. Thus, the timing of the packets is not predictable as it is in a direct point-to-point link such as an E1 or T1 link. Packets may be dropped, delayed, or transmitted out of order as they are transmitted over the Internet.

In the uplink direction, MS 220 sends GSM data via an Air interface to small-scale BTS 202, which translates GSM data into IP data (for example, UDP or TCP packets), and relays the IP data to IP network 222. In this case, translating the GSM data into IP data includes adding an IP header to one or more GSM frames. The IP data is sent to the Internet via a modem 204 (e.g., a digital subscriber line (DSL) or cable modem). To reach BSC 210, the data is transferred via an Internet Service Provider (ISP)'s equipment 206, such as a router or a switch, to an aggregation gateway (AGW) 208. The AGW translates IP data received back into GSM and sends it to BSC 210 via the BSC's communication interface. The BSC transmits data it receives to the core mobile network.

In the downlink direction, the BSC sends GSM data to AGW 208, which translates the GSM data into IP data and sends it to ISP equipment 206 to transmit the IP data to the Internet. DSL modem 204 receives the IP data from the Internet, translates it back to GSM, and sends it to small-scale BSC 202. Small-scale BSC 202 relays the data to mobile station 220. In the following discussion, the modem-Internet-ISP equipment combination is treated as a whole and is referred to as the IP network.

Interface 211 of BSC 210 includes an Abis interface supporting the Abis protocol, and interface 221 includes an Air interface supporting the GSM Air interface protocol. Both protocols are time synchronous network layer protocols that have specific timing/synchronization requirements for data transmitted and received on the interface. For example, the Abis protocol requires consecutive packets to be sent/received every 20 ms in some embodiments. Packets are considered consecutive if they have consecutive values in a specific field in the packet header (such as a frame number field). During a communication session, if there is discontinuity in the data, in other words, packets are out of sequence, delayed, dropped, or bursting (i.e., the rate at which the data is received is uneven), the synchronization requirements of the Abis or Air protocol will no longer be met. In this situation, the BSC may determine that the link has failed and reset the session. In the configuration shown in FIG. 2, IP packets are transferred over the Internet via unreliable links and tend to result in discontinuities in the data received. If not handled properly, the BSC may repeatedly reset the sessions, making the system inoperable. In some embodiments, the small-scale BTS and the AGW both include an interface for receiving packets that are sent via an unsynchronized link, labeled as 230 and 232, respectively. In some embodiments, the interface is a bi-directional interface that also sends data to the unsynchronized link. The small-scale BTS and the AGW also include synchronizers 212 and 214, respectively. As will be described in greater detail below, the synchronizers are configured to process packets to satisfy the synchronization requirements of the appropriate protocol so that the session is maintained. In some embodiments, the synchronizers are implemented as a processor operatively coupled to an interface that is configured to receive data sent via a first, discontinuous link such as the Internet. In the example system shown above, the small-scale BTS and the AGW are discrete devices. In other embodiments, the functionalities of these devices are implemented differently. For example, some or all of the functions of the small-scale BTS may be implemented by the modem, some or all of the functions of the AGW may be integrated into the ISP equipment and/or the BSC.

Figure 3:
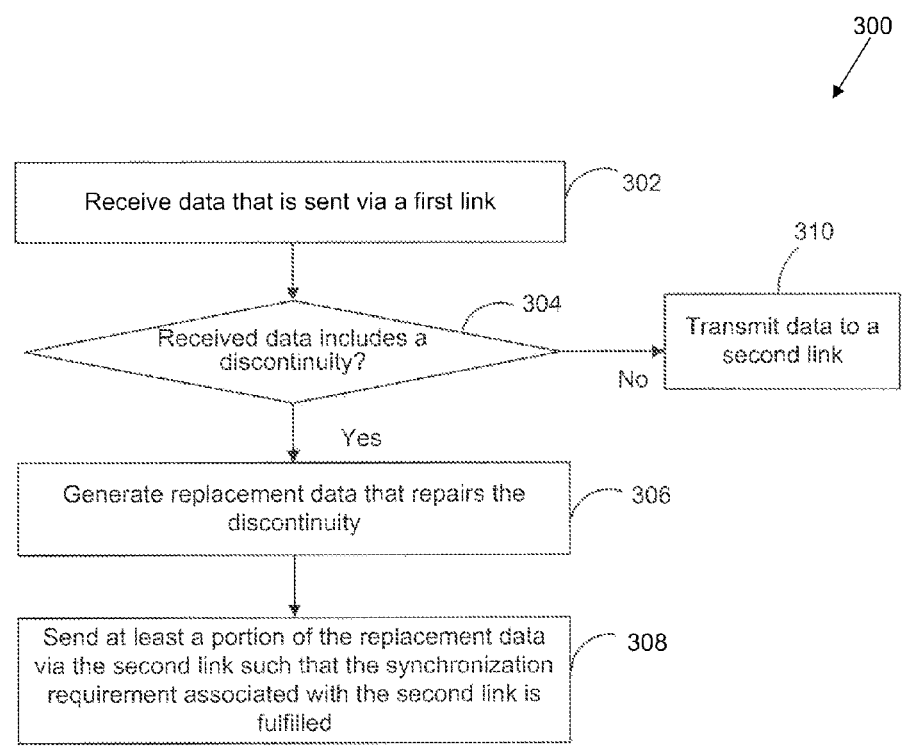
FIG. 3 is a flowchart illustrating an embodiment of a data transfer process.

FIG. 3 is a flowchart illustrating an embodiment of a data transfer process that includes discontinuity handling. In various embodiments, process 300 may be implemented on a small-scale BTS or an AGW. At 302, data that is sent via a first link is received. In an example system such as 200, the received data includes IP packets (such as TCP or UDP packets). The link via which the data is transferred, i.e., the Internet, may comprise multiple physical connections that are wire lines and/or wireless connections. Since the link is unreliable and unsynchronized, and received data may be dropped, delayed, or received out-of-order. At 304, it is determined whether the data includes any discontinuity. In some embodiments, the received data is deemed to have a discontinuity if an expected packet is dropped completely and never received, or if an expected packet is received but has arrived too late or significantly out of order. As will be described in greater detail below, in some embodiments, frame numbers associated with the packets are compared a reference frame number to make the determination.

If it is determined that there is a discontinuity, at 306, replacement data that repairs the discontinuity is generated. In some embodiments, the replacement data includes one or more replacement GSM frames that correspond to data that is deemed missing, delayed, or received out of order. At 308, the replacement data is sent via the second link to such that a synchronization requirement associated with the second link is fulfilled. If, however, there is no discontinuity, the data is transmitted to the second link at a rate that fulfills the synchronization requirement at 310. For example, 3 GSM data frames may be transmitted every 20 ms in some embodiments. In some embodiments, bursting data (i.e., data received at uneven data rates) is also considered discontinuous, and the synchronizer handles data bursts by buffering the bursting data along with any other received non-bursting data, and transmitting the data at a rate that fulfills the synchronization requirement.

Figure 4A:
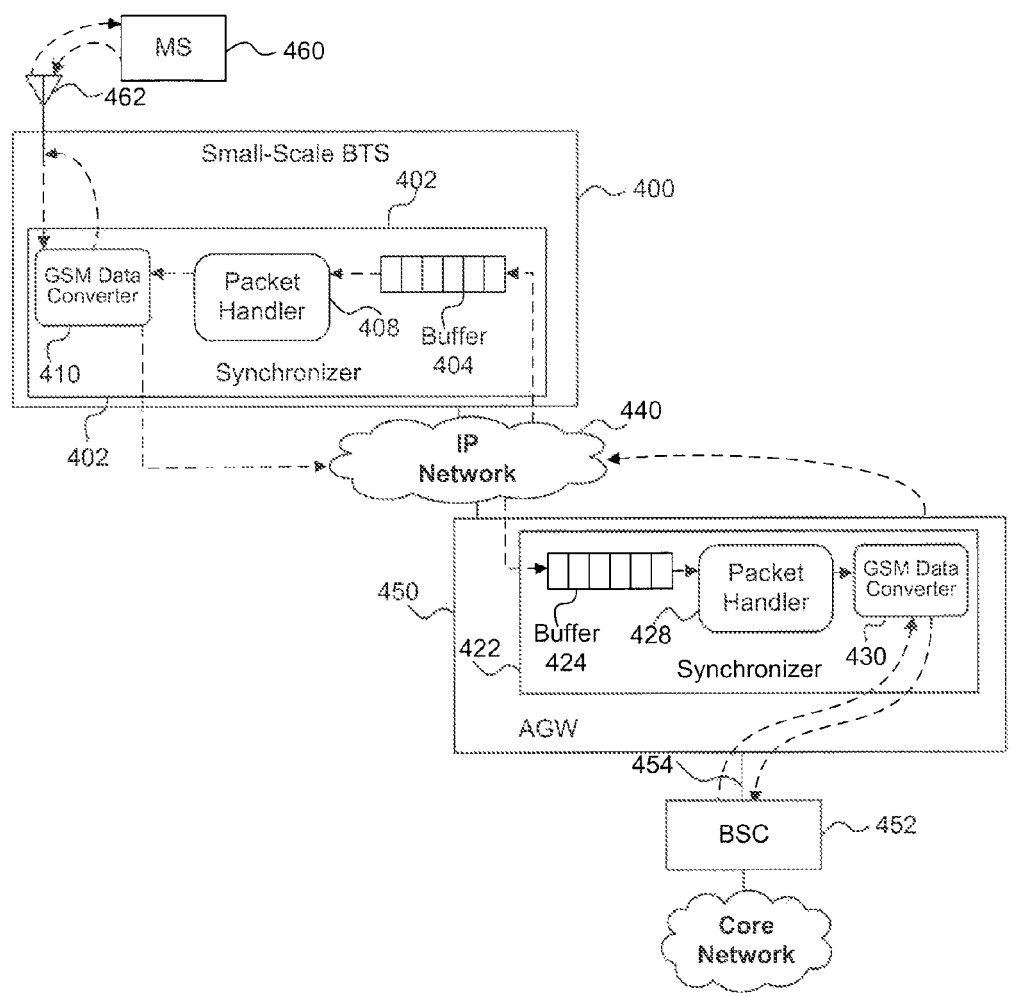
FIG. 4A is a block diagram illustrating another embodiment of a GSM system.

FIG. 4A is a block diagram illustrating another embodiment of a GSM system. In this example, synchronizers 402 and 422 that are respectively included in small-scale BTS 400 and AGW 450 are illustrated in greater detail. The synchronizers may be implemented using a processor that includes one or more devices, circuits, and/or processing cores configured to processing data, such as computer instructions. Here, functional components of synchronizers 402 and 422 include, respectively, buffers 404 and 424, packet handlers 408 and 428, and GSM data converters 410 and 430. The components may be implemented in software, hardware, or a combination. Although separate components are shown in the example, functionalities of the components may be combined or further divided in other embodiments.

Figure 4B:
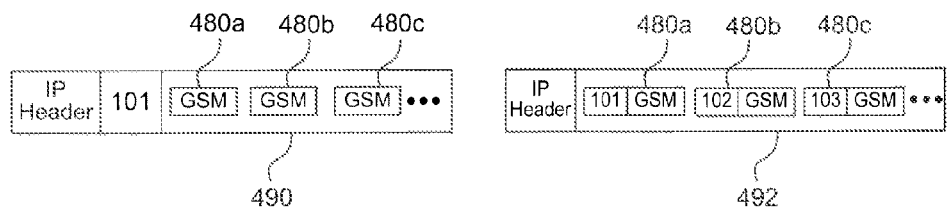
FIG. 4B illustrates IP packet examples.

In the downlink direction (i.e., data is sent from the core network via the BSC to the small-scale BTS to the mobile station), GSM data converter 430 within AGW 450 receives GSM data from BSC 452 via an Abis interface 454. For purposes of example, it is assumed that the link between the AGW and the BSC is a direct point-to-point link such as a T1 or E1 link or other reliable link such that packets are received synchronously at the AGW. The GSM data converter converts GSM data to IP packets. In some embodiments, the conversion includes grouping a number of consecutive GSM frames and creating an IP packet payload that comprises the group of GSM frames. FIG. 4B illustrates some IP packet examples. Although the examples show IP packets comprising multiple GSM frames, it is permissible to have a single GSM frame in a converted IP packet. In example packet 490, a single frame number (101) is assigned to a group of consecutive GSM frames 480a, 480b, 480c, etc. In example packet 492, a group of GSM frames are included in the payload. Each GSM frame (480a, 480b, 480c, etc.) is assigned a frame number (101, 102, 103, etc.) that is used to track GSM frames received. In both implementations, an IP header is added to the payload, and fields in the IP header such as packet length, check sum, source and destination addresses are configured by a network protocol stack. For purposes of illustration, it is assumed that a packet format similar to 490 is used in the following discussion. The techniques described are generally applicable to other packet formats that use frame numbers to track consecutive GSM frames, such as 492.

Once converted, the IP packets are sent by the GSM data converter to the IP network as quickly as possible. These packets are routed to small BTS 400 via IP network 440. Given the unreliable nature of the IP network, some packets may be dropped, delayed, transmitted out of order, or otherwise degraded such that they are deemed missing at the BTS. Packets that reach the small BTS 400 are examined by packet handler 408. If the packet payload meets specific rules as described below, the packet handler will store the packet in buffer 404. If, however, the rules are not met, the packet is discarded. The packet handler further monitors the packets in the buffer, determines whether any packet is missing, and generates replacement packet or GSM frames as appropriate.

As used herein, transferring data in packets from a storage location (such as a buffer) to the output interface of the device is referred to as playing packets. As will be described in greater detail below, packets are played at a rate that satisfies the synchronization requirements of the output link. In this example, in the downlink direction, the playing process includes the packet handler evaluating whether buffered data is appropriate for transmission to the Abis interface, generating replacement data as appropriate, passing appropriate received data and/or replacement data to GSM data converter 410, and the GSM data converter translating the IP packets back to GSM formatted data and sending them to the mobile station at a rate that satisfies the synchronization requirement of the Air interface. In some embodiments, the packet handler stores received packets in the buffer, and signals the GSM data converter when the packets are ready to be played. The GSM converter plays the packets by taking the packets directly from the buffer, translating them into GSM format (i.e., removing IP headers and converting payload data back to GSM frames), and sending them to the mobile station. The packets are played at a rate that satisfies the synchronization requirements of the Air Interface in the downlink direction.

In the uplink direction (i.e., data is sent from the mobile station to the BSC), the above process is mirrored. Mobile station 460 sends GSM data via a wireless link, over the Air interface to GSM data converter 410. The GSM data converter converts GSM data to IP packets, places frame numbers in the IP packet payload, and sends the packets to the IP network as quickly as possible. The packets are routed to BSC 452 via IP network 440. Again, there may be discontinuity in the received data, i.e., some of the packets may be dropped, delayed, transmitted out of order, etc. Upon reaching AGW 450, the packets are examined by packet handler 428. If the packet includes expected data (i.e., the reference number(s) in the GSM frame(s) are as expected), the packet handler will store the packet in buffer 424; else, the packet is discarded. The packet handler also monitors the packets in the buffer, determines whether any packet is missing, and generates replacement packet(s) as appropriate. The packet handler passes appropriate buffered packets and/or replacement packets to GSM data converter 430, or places the packets in the buffer and signals the GSM data converter when the packets are ready to be played. The GSM data converter translates the packets back to GSM frames and sends them to the BSC.

Figure 5:
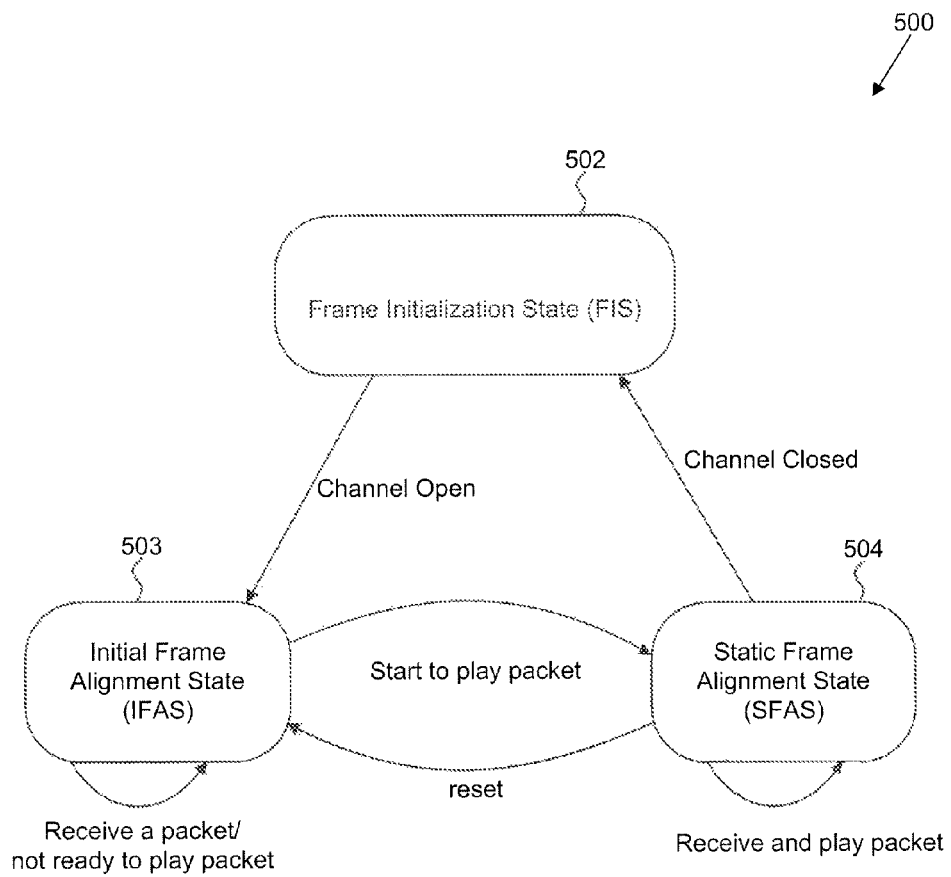
FIG. 5 is a state diagram illustrating an embodiment of the states during a GSM call session.

In some embodiments, a state machine is used to control the various states experienced by a synchronizer during a call session. FIG. 5 is a state diagram illustrating an embodiment of the states during a GSM call session. In this example, state machine 500 is implemented on a synchronizer such as 212 or 214. The starting state is frame initialization state (FIS) 502. The synchronizer waits in the frame initialization state until a communications channel opens (for example, when a call session is set up and the network signals that a link should be established), at which point initial frame alignment state (IFAS) 503 is entered into. The synchronizer receives packets and stores them in the buffer, and remains in the initial frame alignment state as long as the packets are not yet ready to be played (i.e., ready to be transferred from the buffer to the output interface). Packets are ready to be played when a specified condition is met. For example, in some embodiments packets are ready to be played a certain number of consecutive packets have been accumulated. Once packet playing starts, static frame alignment state 504 is entered into. In this state, the device continues to receive packets, allow packets to be played, and generate replacement packets as necessary to ensure that one or more synchronization requirements of the interface are fulfilled while the packets are played. A great number of replacement packets, could indicate a poor connection or the characteristics of the network have changed significantly such as delay and jitter, and causes the state to transition from the static frame alignment state to initial frame alignment state so that packet playing can be reset. The communication channel remains open. In other words, the call remains active and is not terminated merely because some packets are dropped. The state transitions from static frame alignment state to frame initialization state when the communication channel is closed, e.g. when the call session terminates.

Figure 6A:
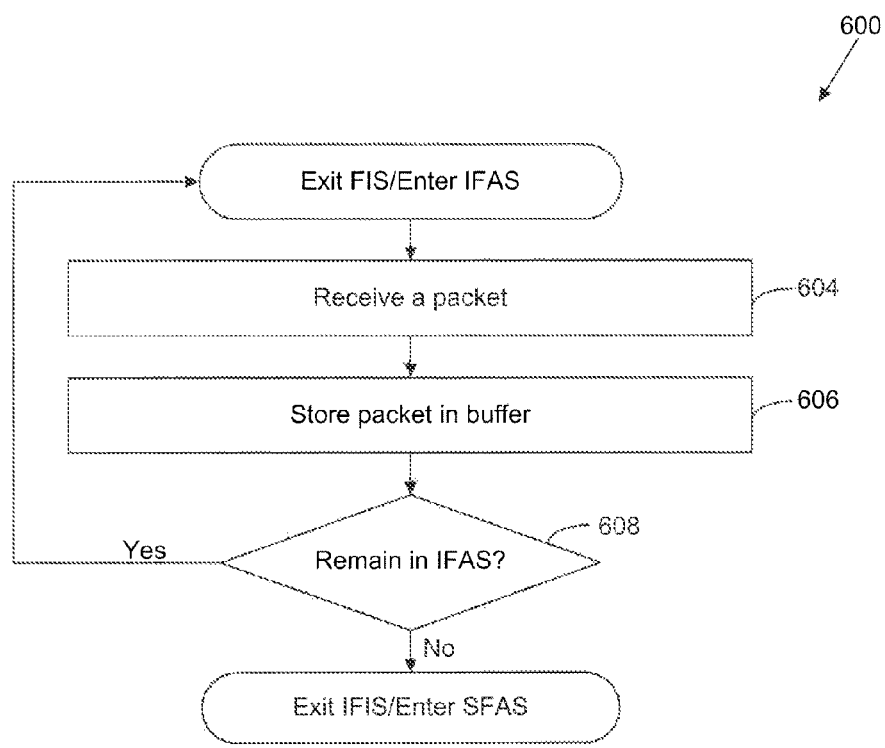
FIGS. 6A and 6B are flowcharts illustrating processes during the initial frame alignment state according to some embodiments.
Figure 6B:
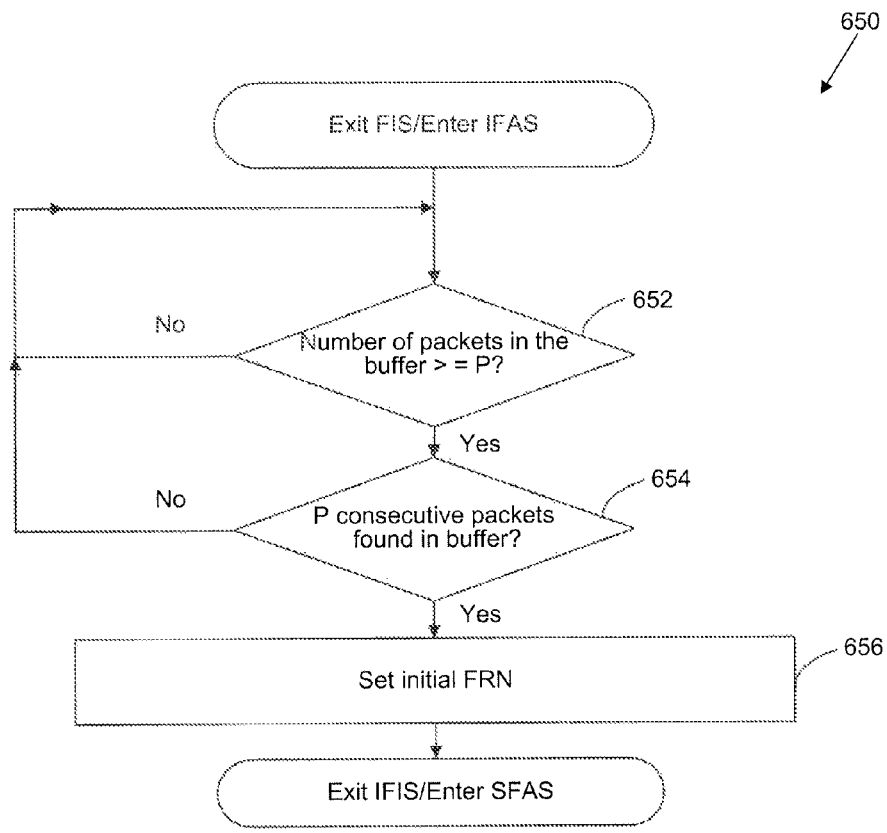

FIGS. 6A and 6B are flowcharts illustrating processes during the initial frame alignment state according to some embodiments. Processes 600 and 650 are included in a packet handler in some embodiments. They may be implemented as separate threads, processes, on a single device or separate devices, or in any other appropriate ways. Process 600 initiates when the communication channel opens, and the state machine exits the frame initialization state (FIS 502) and enters the initial frame alignment state (IFAS 503). At 604, a packet is received. At 606, the packet is stored in a buffer such as buffer 404 or buffer 424, depending on the device on which the process is operating. At 608, it is determined whether the state should remain in IFAS. 604 and 606 repeat as long as the state remains in IFAS. The state switches from IFAS to SAFS when it is determined that the packets received are ready to be played. In this example, the determination is made by process 650 as described below. In various embodiments, process 600 detects any state change by checking a global status flag or by receiving a signal from another process that caused the state to change, such as process 650. In some embodiments, the buffer used to store the packets is a fixed size buffer, which reduces the possibility of introducing discontinuity due to buffer size changes. If packets continue to be received while the state remains in FIS, earlier packets stored in the buffer may be overwritten by newly received packets as the buffer gets full.

Process 650 also initiates when the communication channel opens, the FIS is exited and the IFAS is entered. The buffer, sometimes referred to as a jitter buffer is scanned periodically. In some embodiments, the buffer is scanned every 20 ms. During each scan, it is determined, at 652, whether the number of packets in the buffer is greater than or equal to a predetermined play threshold (designated as P in this example). In some embodiments, P is set to the number of packets that are expected to be received during a period of time that is equal in length to the maximum amount of jitter that the implementer choose to setup for. In one example, P is set to 3. If the number of packets in the buffer is less than P, the process continues to scan the buffer at 651. If, however, the scan result indicates that the number of packets in the buffer is greater than or equal to P, the frame numbers of the packets are examined to determine whether P consecutive packets are found in the buffer at 654. Packets may be stored out of order in the buffer yet still satisfy the test at 654. For example, packets with frame numbers 102, 104, 105, and 103 are stored in the buffer. Although the packets are out of order, three consecutive packets 102-104 are still found. If P consecutive packets are found in the buffer, an initial frame reference number (FRN) is set at 656. The FRN is used to track the expected frame number of the packet to be played next, and it assists with the determination of whether a packet is missing. In some embodiments, the initial FRN is set to the smallest frame number of the P consecutive packets. Thus, in the example above, the initial FRN is set to 102. The process exits IFAS and enters SFAS. The process sets status flag, sends notification, or otherwise takes appropriate action so that the state change takes effect for other processes such as 600. If, however, P consecutive packets are not located in the buffer, the process continues to scan packets in the buffer and returns to 652.

Figure 7A:
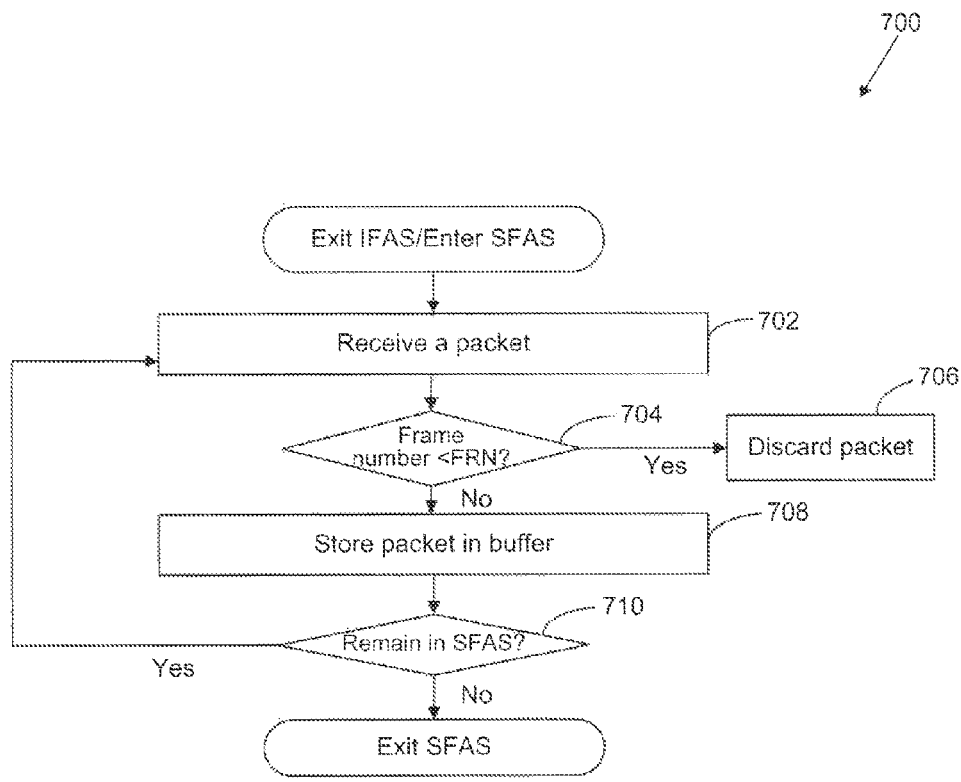
FIGS. 7A and 7B are flowcharts illustrating processes during the static frame alignment state according to some embodiments.
Figure 7B:
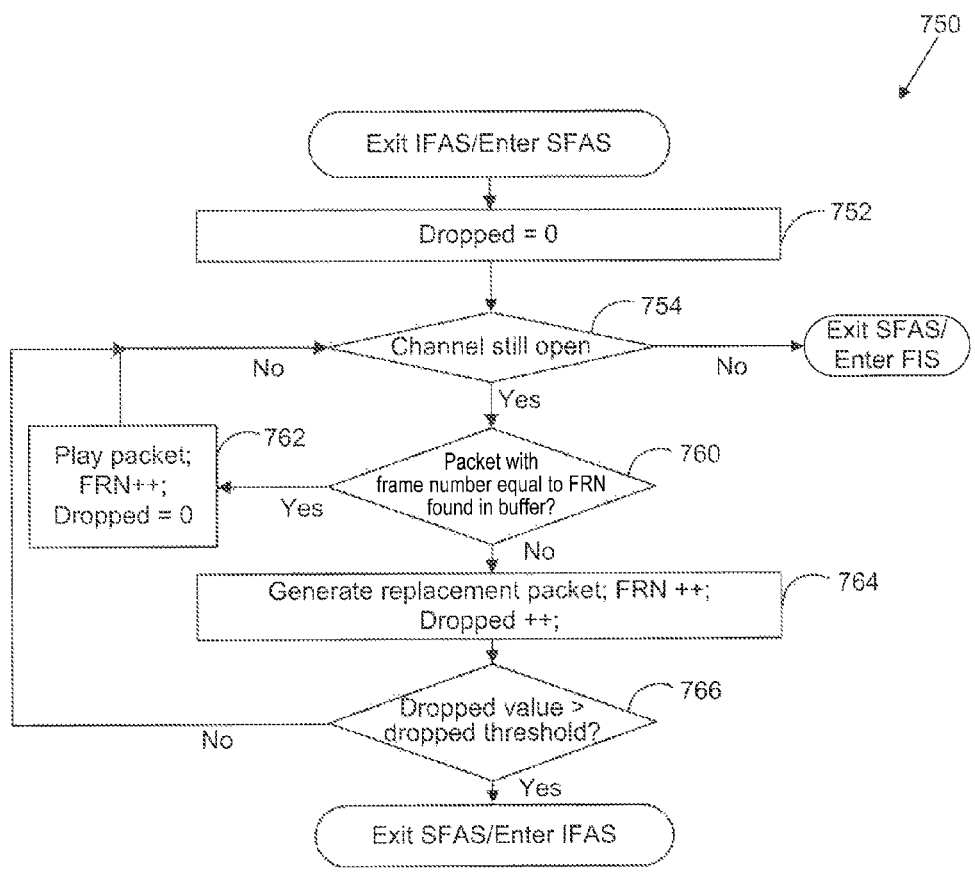

FIGS. 7A and 7B are flowcharts illustrating processes during the static frame alignment state according to some embodiments. Processes 700 and 750 are included in a packet handler in some embodiments. They may be implemented as separate threads, processes, on a single device or separate devices, or in any other appropriate ways. Process 700 initiates when the initial frame alignment state is exited and the static frame alignment state is entered. At 702, a packet is received. Its frame number is compared with the FRN at 704 (recall that the initial FRN was set during the IFAS at 656 of process 600). If the frame number of the packet is less than FRN, the packet has arrived too late and is discarded at 706. Else, the packet is stored in the buffer, at 708. The process checks for state status at 710. If it should remain in SFAS, and the process repeats and continues to receive packets, compare the frame number with the FRN, and store or discard them. In some embodiments the data queue in the buffer is allowed to grow to handle bursts. If the state should no longer remain in SFAS, FIS is entered if the channel is closed, or IFAS is entered if the alignment state is reset.

Process 750 also initiates when the initial frame alignment state is exited and the static frame alignment state is entered. At 752, a dropped counter for tracking the number of consecutively dropped packets is set to 0. At 754, the channel is examined to determine whether it is still open. If the channel is no longer open, (for example, if a call session has completed), the SFAS is exited and the FIS is entered at 756. If the channel is still open, at 760, it is determine whether a packet with a frame number that is the same as the FRN can be found in the buffer. If so, at 762, the packet is played. The packet handler plays the packet by sending it to the GSM data converter, or by instructing the GSM data converter to pull the packet out of the buffer and send it to the output interface. Further, the FRN is incremented and the dropped counter is reset to zero. Process continues at 754. If, however, a packet with the expected frame number of FRN is not found, a replacement packet is generated at 764. The replacement packet is sometimes referred to as the idle packet. The replacement packet has a frame number that is set to the current FRN. The payload of the replacement packet depends on implementation. In some embodiments, the payload is set to some predetermined value such as 0. Other values may be used. Thus, a replacement packet may appear to the end user of the mobile station as a brief moment of silence/blank/static or otherwise decreased call quality, giving the user an overall experience that is improved over a dropped call. The FRN and the dropped counter are both incremented. It is determined at 766 whether the dropped counter value exceeds a dropped threshold value. In some embodiments, the dropped threshold value is set to 8. If the counter value exceeds the threshold, too many packets have been dropped consecutively, indicating a serious degradation in call quality. SFAS is exited and IFAS is entered, and the initial FRN is reset as appropriate. If the dropped threshold is not exceeded, the process continues at 754.

Figure 8:
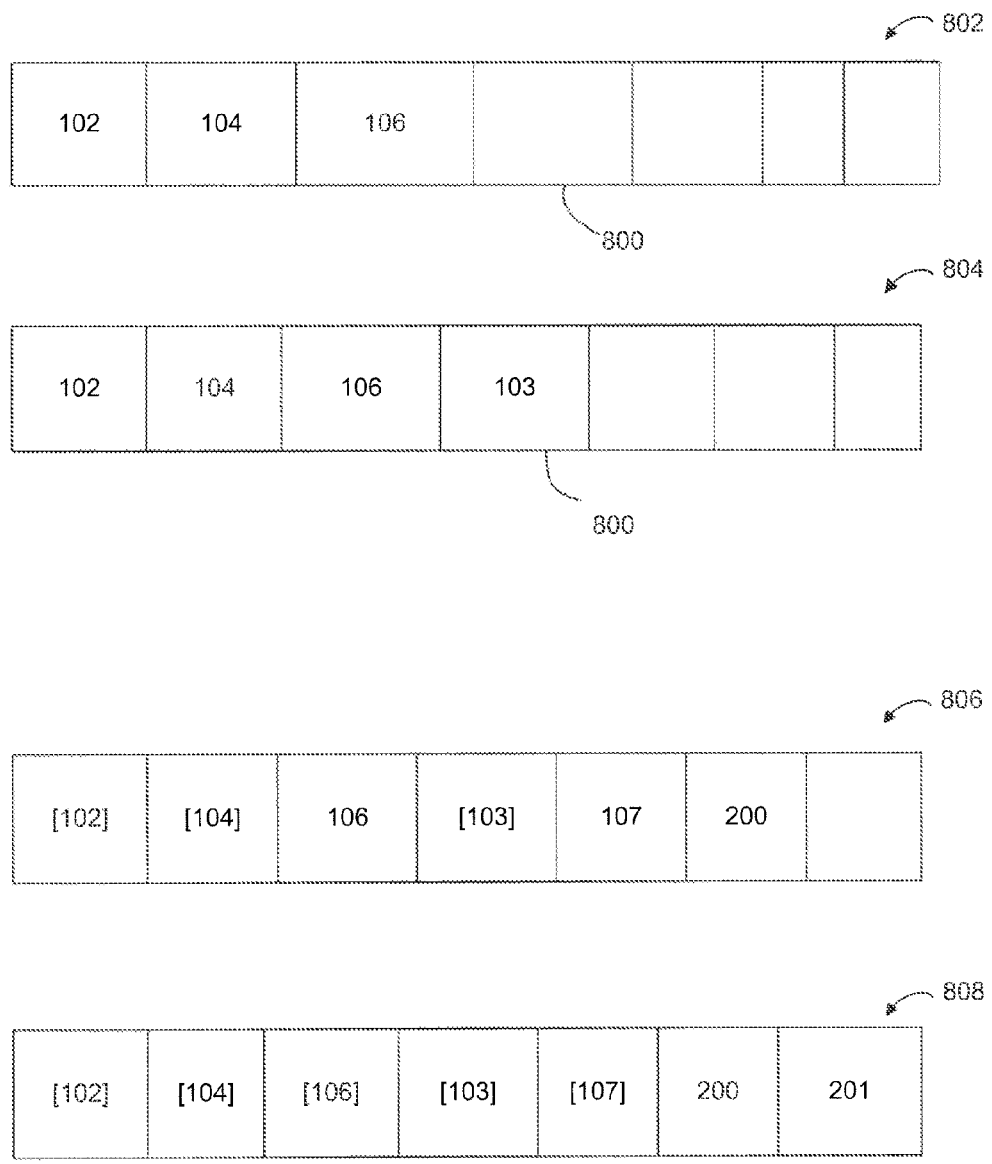
FIG. 8 illustrates example buffer contents according to an embodiment of the invention.

FIG. 8 is an example illustrating the processes described above. Frame numbers of packets in buffer 800 are shown in the order the packets are received. As shown in 802, the system is in FIS. Packets 102, 104, and 106 are received and stored in the buffer according to process 600. Process 650 executes in the meantime, and once it is detected that the number of packets in the buffer is greater or equal to P (in this case 3), it is determined whether 3 consecutive packets are found in the buffer. Here, the frame numbers of the packets in the buffer are not consecutive. Processes 600 and 650 continue, and, as shown in 804, packet 103 is received. At this point, the number of packets in the buffer now exceeds 3, and there are 3 consecutive packets in the buffer. The FRN is set to the smallest frame number of the consecutive packets, which is 102. IFAS is exited and SFAS is entered. Process 700 and 750 are executed contemporaneously. As shown in 806, packet 107 and 200 are received and stored in the buffer according to process 700. According to process 750, packets 102, 103, and 104 are played, and the FRN increments by 1 each time a packet is played. The dropped counter remains at 0. After packet 104 is played, the FRN is 105. There is, however, no packet with such a frame number in the buffer. Thus, a replacement packet is generated with a frame number of 105, and FRN is incremented to 106 and the dropped counter increments to 1. Process 750 will continue to play replacement packet 106 and stored packet 107. After that, as shown in 808, packets 108-199 are not received and packets 200 and 201 are received. According to process 750, more replacement packets are generated and played, and the dropped counter increments until it exceeds the dropped threshold and SFAS is exited and IFAS is entered, at which time processes 600 and 650 repeat.

Transferring data received on an unreliable link (such as the Internet) to another link that has a synchronization requirement has been disclosed. The techniques described above are applicable the GSM network, the UMTS network, or other appropriate wireless/cellular networks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for transferring data in a data translating device, comprising:
    receiving data via an unsynchronized protocol;
    identifying, within the received data, a group of data packets having a number of consecutive data packets equal to or greater than a predetermined number;
    setting a frame reference number equal to a frame number of a data packet having a smallest frame number within the identified group;
    generating replacement data corresponding to nonconsecutive data packets within the received data;
    grouping the replacement data with the identified group to provide consecutive data packets; and
    transmitting the consecutive data packets via a synchronized protocol.

2. The method of claim 1, further comprising:
    storing another data packet from within the received data if another frame number of the another data packet is greater than the frame reference number; and
    discarding the another data packet if the another frame number is less than the frame reference number.

3. The method of claim 1, wherein the group of data packets is from among a plurality of groups, and wherein the transmitting comprises:
    transmitting the plurality of groups when an accumulated number of the plurality of groups meets or exceeds another predetermined number.

4. A system, comprising:
    a first data synchronizer configured to receive data via a first synchronized protocol, and to transmit the data via an unsynchronized protocol; and
    a second data synchronizer configured to receive the transmitted data via the unsynchronized protocol, to identify a group of packets within the data having consecutive frame numbers, to set a frame reference number equal to a frame number of a data packet having a smallest frame number from within the group, to generate replacement data corresponding to nonconsecutive data packets within the received transmitted data, to group the replacement data with the identified group to provide consecutive data packets, and to transmit the consecutive data packets via a second synchronized protocol.

5. The system of claim 4, wherein the group of data packets is from among a plurality of groups, and wherein the second data synchronizer is further configured to transmit the plurality of groups when an accumulated number of the plurality of groups meets or exceeds a predetermined number.

6. The system of claim 4, wherein the second data synchronizer is further configured to store another data packet from within the received transmitted data if another frame number corresponding to the another data packet is greater than the frame reference number, and to discard the another data packet if the another frame number is less than the frame reference number.

7. The system of claim 6, wherein the second data synchronizer is further configured to receive the transmitted data in an initial frame alignment state (IFAS), to transmit the consecutive data packets in a static frame alignment state (SFAS), and to switch from the SFAS to the IFAS if a number of discarded packets exceeds a threshold number.

8. A data synchronizer, comprising:
    a buffer configured to store data packets initially received via a first protocol, each data packet within the data packets having a frame number;
    a packet handler configured to identify a group of data packets having consecutive frame numbers, the group being defined by a number of consecutive data packets equal to or greater than a predetermined number, and to set a frame reference number equal to a frame number of a data packet having a smallest frame number from within the group;
    a data converter configured to read the data packets from the buffer and to transmit the group of data packets via a second protocol, and
    wherein the packet handler is further configured to store subsequently received data packets having a frame number greater than the frame reference number in the buffer, and to otherwise discard subsequently received data packets.

9. The data synchronizer of claim 8, wherein the data synchronizer is further configured to receive the data packets in an initial frame alignment state (IFAS), to transmit the group of data packets in a static frame alignment state (SFAS), and to switch from the SFAS to the IFAS if a number of discarded subsequently received data packets exceeds a threshold number.

10. The data synchronizer of claim 9, wherein the data synchronizer is further configured to maintain communications with a mobile device via the second protocol when the data synchronizer switches from the SFAS to the IFAS.

11. The data synchronizer of claim 8, wherein the first protocol is an unsynchronized protocol, and wherein the second protocol is a synchronized protocol.

12. The data synchronizer of claim 11, wherein the unsynchronized protocol is an Internet Protocol (IP), and wherein the synchronized protocol is a Global System for Mobile (GSM) air interface.

13. The data synchronizer of claim 11, wherein the unsynchronized protocol is an Internet Protocol (IP), and wherein the synchronized protocol is a base station controller (BSC) to base transceiver station (BTS) Interoperability Specification interface.

14. The data synchronizer of claim 8, wherein the data synchronizer is coupled to a device comprising:
    a base transceiver station (BTS);
    a modem;
    a device configured to provide interne service;
    an aggregation gateway (AGW); or
    a base station controller (BSC).

* * * * *